United States Patent
Shahmohammadian et al.

(10) Patent No.: US 10,659,138 B1
(45) Date of Patent: May 19, 2020

(54) SYSTEM AND METHOD FOR PRECODING IN A LINE OF SIGHT (LOS) MULTIPLE-INPUT MULTIPLE-OUTPUT (MIMO) COMMUNICATION SYSTEM

(71) Applicants: Hoda Shahmohammadian, Ottawa (CA); Ming Jian, Kanata (CA)

(72) Inventors: Hoda Shahmohammadian, Ottawa (CA); Ming Jian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/209,428

(22) Filed: Dec. 4, 2018

(51) Int. Cl.
 H04B 7/10 (2017.01)
 H04B 17/336 (2015.01)
 H04B 7/06 (2006.01)
 H04B 7/0456 (2017.01)

(52) U.S. Cl.
 CPC ............. *H04B 7/10* (2013.01); *H04B 7/0486* (2013.01); *H04B 7/0689* (2013.01); *H04B 17/336* (2015.01)

(58) Field of Classification Search
 CPC ...... H04B 7/10; H04B 17/336; H04B 7/0486; H04B 7/0689
 See application file for complete search history.

(56) References Cited

U.S. PATENT DOCUMENTS

| | | | |
|---|---|---|---|
| 7,711,066 B2 | 5/2010 | Jiang et al. | |
| 8,229,017 B1 | 7/2012 | Lee et al. | |
| 8,948,297 B2 * | 2/2015 | Zhang | H04B 7/0456 375/296 |
| 9,077,407 B2 | 7/2015 | Koren et al. | |
| 10,044,423 B2 | 8/2018 | Penna et al. | |
| 2006/0067428 A1 * | 3/2006 | Poon | H04L 27/2608 375/299 |
| 2013/0286949 A1 * | 10/2013 | Tomeba | H04B 7/0452 370/328 |

FOREIGN PATENT DOCUMENTS

CN 101166047 A 4/2008

OTHER PUBLICATIONS

T. Halsig and B. Lankl, "Channel Parameter Estimation for LOS MIMO Systems", published in WSA 2016, 20th International ITG Workshop on Smart Antennas, published on Mar. 9, 2016, Munich, Germany, 5 pages.

H. Harashima and H. Miyakawa, "Matched-Transmission Technique for Channels With Intersymbol Interference", in IEEE Transactions on Communications, vol. Com-20, No. 4, published Aug. 1972, 7 pages.

(Continued)

*Primary Examiner* — Janice N Tieu

(57) ABSTRACT

Precoding is a technique that may be used in wireless communications when antenna spacing in a multiple-input multiple-output (MIMO) system is smaller than optimum spacing conditions. A precoding system and method are disclosed herein that distributes power among streams to trade-off increased data throughput and complexity of interference cancellation. Distributing power among streams may increase data throughput compared to singular value decomposition (SVD) precoding, but interference may be reduced compared to other methods that result in relatively high interference.

24 Claims, 9 Drawing Sheets

(56) References Cited

OTHER PUBLICATIONS

M. Tomlinson, "New Automatic Equaliser Employing Modulo Arithmetic", in Electronics Letters, vol. 7, Nos. 5/6, published Mar. 25, 1971, 2 pages.

O. Besson and P. Stoica, "On Parameter Estimation of MIMO Flat-Fading Channels With Frequency Offsets", in IEEE Transactions on Signal Processing, vol. 51, No. 3, published Mar. 2003, 12 pages.

Y. Jiang, W.W. Hager and J. Li, "The geometric mean decomposition", in Linear Algebra and its Applications, vol. 396, published in 2004, 12 pages.

Y. Jiang, J. Li, and W.W. Hager, "Uniform Channel Decomposition for MIMO Communications", in IEEE Transactions on Signal Processing, vol. 53, No. 11, published Nov. 2005, 12 pages.

\* cited by examiner $$\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix}$$

Example 1

$$\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \rightarrow \begin{bmatrix} Thr_1 & \alpha & 0 & 0 \\ 0 & \tilde{\gamma}_1 & 0 & 0 \\ 0 & 0 & \lambda_3 & 0 \\ 0 & 0 & 0 & \lambda_4 \end{bmatrix}$$

Matrix Entry (1,2)

Example 2

$$\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \rightarrow \begin{bmatrix} Thr_1 & \alpha & \alpha & 0 \\ 0 & \tilde{\gamma}_1 & 0 & 0 \\ 0 & 0 & \tilde{\gamma}_2 & 0 \\ 0 & 0 & 0 & \lambda_4 \end{bmatrix}$$

Example 3

$$\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \rightarrow \begin{bmatrix} Thr_1 & \alpha & \alpha & \alpha \\ 0 & Thr_2 & \alpha & \alpha \\ 0 & 0 & \tilde{\gamma}_1 & 0 \\ 0 & 0 & 0 & \tilde{\gamma}_2 \end{bmatrix}$$

Example 4

FIG. 5

$$\begin{bmatrix} \lambda_{1h} & 0 & 0 & 0 \\ 0 & \lambda_{1v} & 0 & 0 \\ 0 & 0 & \lambda_{2h} & 0 \\ 0 & 0 & 0 & \lambda_{2v} \end{bmatrix} \rightarrow \begin{bmatrix} Thr_{1h}\alpha & \alpha & \alpha & \alpha \\ 0 & Thr_{1v}\alpha & \alpha & \alpha \\ 0 & 0 & \tilde{\gamma}_{1h} & 0 \\ 0 & 0 & 0 & \tilde{\gamma}_{1v} \end{bmatrix} \;\;\text{312}$$

HTD precoding NOT applied independently on each polarization $$\begin{bmatrix} \lambda_{1h} & 0 & 0 & 0 \\ 0 & \lambda_{1v} & 0 & 0 \\ 0 & 0 & \lambda_{2h} & 0 \\ 0 & 0 & 0 & \lambda_{2v} \end{bmatrix} \rightarrow \begin{bmatrix} \lambda_{1h} & 0 & \lambda_{2h} & 0 \\ 0 & \lambda_{1v} & 0 & \lambda_{2v} \\ 0 & 0 & 0 & 0 \\ 0 & 0 & 0 & 0 \end{bmatrix} \rightarrow \begin{bmatrix} Thr_{1h}(\alpha) & 0 & 0 & 0 \\ 0 & \tilde{\gamma}_{1h} & 0 & 0 \\ 0 & 0 & Thr_{1v}(\alpha) & 0 \\ 0 & 0 & 0 & \tilde{\gamma}_{1v} \end{bmatrix} \;\;\text{314}$$

HTD precoding applied independently on each polarization

SYSTEM AND METHOD FOR PRECODING IN A LINE OF SIGHT (LOS) MULTIPLE-INPUT MULTIPLE-OUTPUT (MIMO) COMMUNICATION SYSTEM

FIELD

The present application relates generally to wireless communications, and in particular to precoding in a LOS MIMO wireless communication system.

BACKGROUND

In a wireless communication system, data is transmitted from a transmitter to a receiver over a wireless channel, e.g. using microwave transmission.

To try to accommodate the increasing demands of data throughput, spatial multiplexing may be used by implementing a multiple-input multiple-output (MIMO) communication system. In MIMO, the transmitter has N transmit antennas and the receiver has M receive antennas. N transmit streams may be transmitted at the same time, each from a respective one of the N transmit antennas, and M receive streams may be received at the same time, each at a respective one of the M receive antennas. When the term MIMO is used herein, it also encompasses systems in which N=1 or M=1, i.e. single-input multiple-output (SIMO) and multiple-input single-output (MISO) systems. It also encompasses scenarios in which N=M where N and M are greater than one.

MIMO may be utilized in a microwave backhaul system. In a microwave backhaul system, the wireless channel is typically line-of-sight (LOS). As a result, all transmit streams may experience almost the same channel. Therefore, the received signals at the M antennas are typically highly correlated. To help enable spatial multiplexing in LOS MIMO, orthogonality of interfering received signals at the M antennas is desired. One way to try to achieve orthogonality for interfering signals is to focus on antenna geometric spacing. Ideally, to try to achieve orthogonality for interfering signals, the physical distance $h_t$ between adjacent ones of the N transmit antennas and the physical distance $h_r$ between adjacent ones of the M receive antennas should satisfy the relationship $h_t \times h_r = \lambda D/2$, which may be simplified to $$h_t = h_r = \sqrt{\lambda D/2}.$$

D is the physical distance between a transmit antenna and corresponding receive antenna in LOS, and $\lambda$ is the wavelength of the wireless signals transmitted from the transmit antennas to the receive antennas.

For microwave backhaul systems in a traditional frequency band, e.g. long hops, meeting the optimum antenna spacing discussed above is typically impractical. For example, for a 10 km link having a carrier frequency of 13 GHz, the optimum antenna spacing is approximately 10 m, which is impractical to implement. Therefore, other techniques for reducing interference in a LOS MIMO system are desired.

SUMMARY

Precoding is implemented in a LOS MIMO system to try to improve system performance. The specific precoding disclosed herein may distribute power among streams to trade-off increased data throughput and complexity of interference cancellation.

In one embodiment, there is provided a method that includes performing a decomposition of a channel matrix H to obtain matrices M, A, and N, wherein $H=MAN^H$. The channel matrix H represents a wireless channel between a transmitter and a receiver. $N^H$ is the Hermitian of N. M and N are each a unitary and orthogonal matrix. A has the following properties: (1) A is a block diagonal matrix including a first block and a second block that is separate from the first block; (2) the first block is a triangular matrix, wherein each diagonal element of the triangular matrix is less than a maximum singular value of the channel matrix H; and (3) the second block is a diagonal matrix, wherein each diagonal element of the diagonal matrix is less than the maximum singular value of the channel matrix H. In some embodiments, the method may optionally further include performing channel estimation to determine the channel matrix H. In some embodiments, the method may optionally further include receiving a signal from the transmitter and performing equalization of the signal using matrix M.

In another embodiment, there is provided a receiver that includes a precoding matrix generator. The precoding matrix generator is to perform a decomposition of a channel matrix H to obtain matrices M, A, and N, wherein $H=MAN^H$. The channel matrix H represents a wireless channel between a transmitter and the receiver. The matrices M, A, and N have the properties described above. In some embodiments, the receiver may optionally further include a channel estimator to determine the channel matrix H. In some embodiments, the receiver may optionally further include at least one antenna to a receive a signal from the transmitter, and an equalizer to perform equalization of the signal using matrix M.

In another embodiment, there is provided a method that includes receiving a matrix N from a receiver. The method further includes precoding a signal based on the matrix N to obtain a precoded signal and transmitting the precoded signal to the receiver over the wireless channel. The matrix N is related to a channel matrix H as follows: $H=MAN^H$. The channel matrix H represents a wireless channel between a transmitter and the receiver. The matrices M, A, and N have the properties described above. In some embodiments, the method optionally further includes transmitting a reference signal to a receiver for use by the receiver to determine the channel matrix H. In some embodiments, the matrix N was obtained by the receiver from a decomposition of the channel matrix H.

In another embodiment, there is provided a transmitter that includes a precoder to precode a signal based on a matrix N to obtain a precoded signal. The transmitter further includes at least one antenna to transmit the precoded signal to the receiver over the wireless channel. The matrix N is related to a channel matrix H as follows: $H=MAN^H$. The channel matrix H represents a wireless channel between a transmitter and the receiver. The matrices M, A, and N have the properties described above. In some embodiments, the at least one antenna is also to transmit a reference signal to the receiver for use by the receiver to determine the channel matrix H. In some embodiments, the matrix N was obtained by the receiver from a decomposition of the channel matrix H.

In another embodiment, there is provided a method performed by a system that includes a transmitter and a receiver. The receiver performs a decomposition of a channel matrix H to obtain matrices M, A, and N, wherein $H=MAN^H$. The channel matrix H represents a wireless channel between the transmitter and the receiver. The matrices M, A, and N have the properties described above. The receiver sends N to the transmitter to be used for precoding a signal. The transmitter receives N and precedes the signal using N to obtain a precoded signal. The transmitter transmits the precoded signal to the receiver. The receiver receives the precoded signal as a received signal. In some embodiments, the method optionally further includes the receiver performing equalization of the received signal using matrix M. In some embodiments, the method optionally further includes the receiver performing channel estimation to determine the channel matrix H. In another embodiment, there is provided a system including a transmitter and a receiver for performing the method.

By performing the specific precoding described in some embodiments herein, the following benefit may be achieved: distributing power among streams may be used to try to achieve better or optimum capacity compared to a singular value decomposition (SVD) of the channel matrix H, which may increase data throughput; and interference may be reduced compared to other methods that result in relatively high interference, such as geometric mean decomposition (GMD).

BRIEF DESCRIPTION OF THE DRAWINGS

Embodiments will be described, by way of example only, with reference to the accompanying figures wherein:

FIG. 5 illustrates some examples of power transfer for high threshold decomposition (HTD) precoding;

FIG. 6 illustrates an example of applying HTD precoding independently on each polarization compared to not applying HTD precoding independently on each polarization;

DETAILED DESCRIPTION

For illustrative purposes, specific example embodiments will now be explained in greater detail below in conjunction with the figures.

Figure 1:
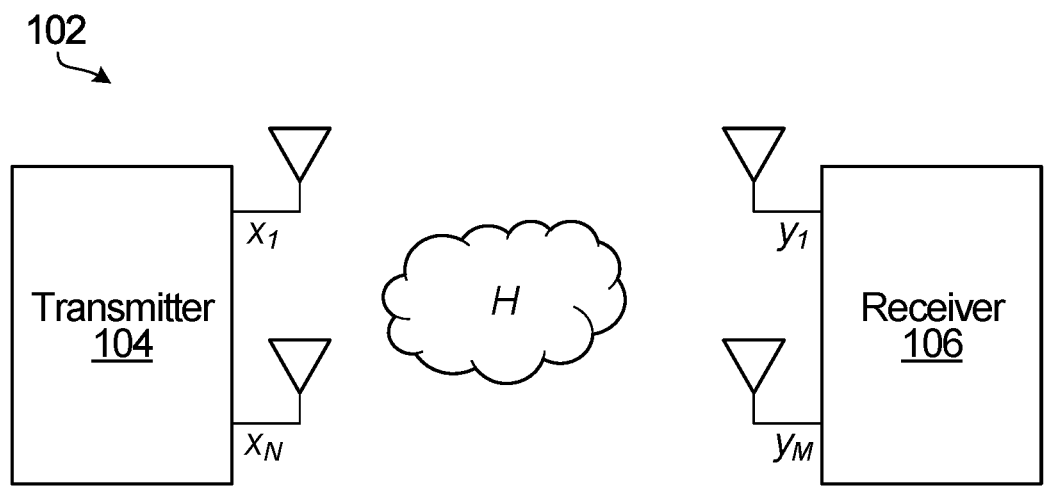
FIG. 1 is a block diagram of a LOS MIMO wireless communication system, according to one embodiment.

FIG. 1 is a block diagram of a LOS MIMO wireless communication system 102, according to one embodiment. The system 102 includes a transmitter 104 having N antennas. The N antennas transmit N transmit streams, each transmit stream from a respective one of the N antennas. The N transmit streams are represented by a vector $$X = \begin{bmatrix} x_1 \\ \vdots \\ x_N \end{bmatrix}.$$

Each entry of the vector X represents a value transmitted from a respective one of the N antennas at a given time unit. The system 102 also includes a receiver 106 having M antennas. The M antennas receive M receive streams, which are represented by vector $$Y = \begin{bmatrix} y_1 \\ \vdots \\ y_M \end{bmatrix}.$$

Each entry of the vector Y represents a value received at a respective one of the M antennas at a given time unit.

The multiplicative fading of the wireless channel is represented by channel matrix H. H is an M×N matrix. Each entry of H represents the multiplicative fading component of the signal path from one of the transmit antennas to one of the receive antennas. The vector Y received at the receiver 106 may be represented as Y=HX+n. n is an M×1 vector representing noise, which may be modeled as additive white Gaussian noise (AWGN). In expanded form:

$$\begin{bmatrix} y_1 \\ \vdots \\ y_M \end{bmatrix} = \begin{bmatrix} h_{11} & \cdots & h_{1N} \\ \vdots & \ddots & \vdots \\ h_{M1} & \cdots & h_{MN} \end{bmatrix} \begin{bmatrix} x_1 \\ \vdots \\ x_N \end{bmatrix} + \begin{bmatrix} n_1 \\ \vdots \\ n_M \end{bmatrix}.$$

Figure 2:
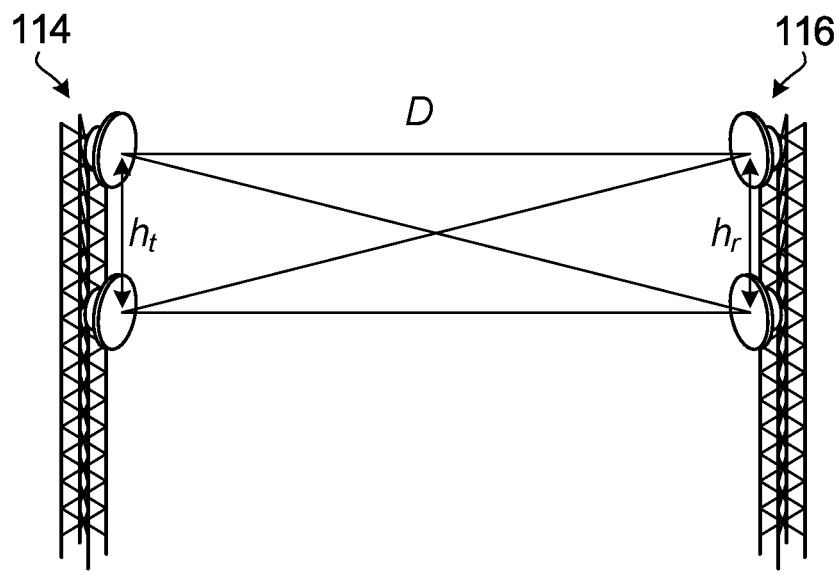
FIG. 2 illustrates an example of two towers in a LOS MIMO system.

The transmitter 104 and receiver 106 may each be installed on a respective tower in a LOS MIMO system. For example, FIG. 2 illustrates an example of two towers in a LOS MIMO system. Tower 114 has the transmitter installed thereon, and the distance between each one of the transmit antennas is $h_t$. Tower 116 has the receiver installed thereon, and the distance between each one of the receive antennas is $h_r$. D is the physical distance between the transmit tower and the receive tower in LOS. As mentioned above, in a LOS MIMO system it is typically not practical to have an optimum spacing $h_t=h_r=h_{opt}$ between adjacent antennas on a tower. Therefore, in embodiments below, precoding is used to mitigate interference between adjacent antennas.

Example Transmitter and Receiver

Figure 3:
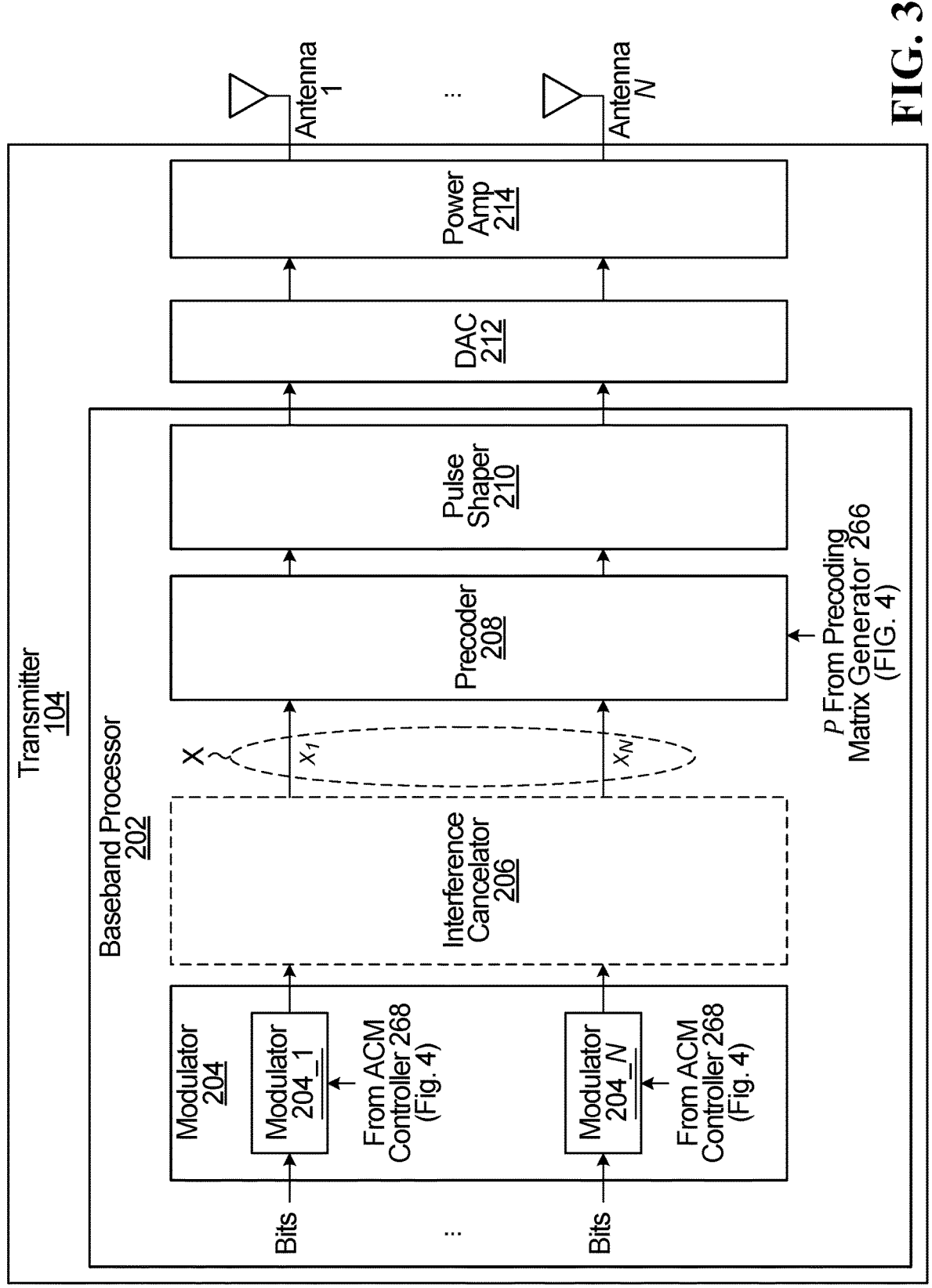
FIG. 3 is a block diagram of a transmitter, according to one embodiment.

FIG. 3 is a block diagram of transmitter 104, according to one embodiment. The transmitter 104 includes a baseband processor 202. The baseband processor 202 includes a modulator 204, an optional interference cancelator 206, a precoder 208, and a pulse shaper 210.

The modulator 204 is implemented by a bank of modulators 204_1 to 204_N, although separate distinct modulators are not necessary, as long as the functionality of the bank of modulators 204_1 to 204_N is implemented by modulator 204. Each modulator 204_1 to 204_N modulates a respective stream of bits to output a stream of symbols. In this example, the number of parallel bit streams modulated by modulator 204 is equal to the number of transmit antennas N. However, this need not be the case. More generally, there may be more or fewer parallel bit streams that are modulated, in which case vector X in FIG. 3 would not have N entries, and the output of precoder 208 would be mapped to the N transmit antennas. For ease of explanation, in the description below the number of parallel bit streams modulated by modulator 204 is equal to the number of transmit antennas N.

The interference cancelator 206, if present, performs interference cancellation. An example way to perform interference cancellation is to perform the Tomlinson-Harashima Precoding (THP) algorithm. The THP algorithm is disclosed in: H. Harashima and H. Miyakawa, "Matched-transmission technique for channels with intersymbol interference," IEEE Trans. Commun., vol. COM-20, no. 4, pp. 774-780, August 1972; and M. Tomlinson, "New automatic equaliser employing modulo arithmetic," Electron. Lett., vol. 7, no. 5/6, pp. 138-139, March 1971.

The precoder 208 performs precoding in the manner explained later.

The pulse shaper 210 performs pulse shaping. An example of pulse shaping implemented by pulse shaper 210 is root raised cosine (RRC) pulse shaping.

The transmitter 104 further includes a digital-to-analog converter (DAC) 212, which converts the digital streams into analog signals. The transmitter 104 further includes a power amplifier 214 for amplifying the power of the signals to be transmitted from the N transmit antennas.

Although not illustrated in FIG. 3, the transmitter 104 would typically include other components. For example, the bits input to modulator 204 would typically be coded bits, but the error control coder is not illustrated in FIG. 3. Also, in some implementations some or all of the components illustrated in FIG. 3 are distributed. For example, the N antennas, power amplifier 214, DAC 212, and baseband processor 202 may be on different chips and/or on different boards and/or physically separated and connected via a network. For the purpose of this disclosure the components will still be referred to as being part of transmitter 104, even if they are distributed in implementation.

In operation, the modulator 204 receives the parallel bit streams. Each bit stream is modulated by mapping the bit stream into a respective symbol stream. In one embodiment, the modulation applied may be quadrature amplitude modulation (QAM), e.g. each one of modulators 204_1 to 204_N may be a QAM modulator. Other modulation schemes may be used instead, and not all modulators 204_1 to 204_N need to implement the same modulation scheme. The order of the modulation scheme for each bit stream is selected based on feedback received from the receiver 106, e.g. based on feedback from the adaptive coding modulation (ACM) controller 268 in the receiver 106 The modulation order of each of the modulators 204_1 to 204_N is adapted over time, based on the feedback from the ACM controller 268, as the conditions of the wireless channel change.

The output of modulator 204 is parallel streams of symbols. Interference cancellation is optionally performed, for the reasons discussed later, and then precoding is performed by precoder 208. The input to precoder 208 is vector X. Before X is transmitted from transmitter 104 in the manner explained earlier in relation to FIG. 1, X is first precoded by a precoding matrix P. That is X→PX. The precoding matrix P is received from the precoding matrix generator 266 of the receiver 106, which is described below in relation to FIG. 4. An updated precoding matrix P may be received on a periodic basis. After precoding is performed, pulse shaping, DAC, and power amplification are performed.

The signal transmitted from the N transmit antennas is represented as PX, and so the received signal is represented as Y=HPX+n.

The baseband processor 202, the modulator 204, the interference cancelator 206, the precoder 208, the pulse shaper 210, the DAC 212, the power amplifier 214, and/or any signal processing components of the transmitter 104 may be implemented in the form of circuitry configured to perform the functions of the baseband processor 202, the modulator 204, the interference cancelator 206, the precoder 208, the pulse shaper 210, the DAC 212, the power amplifier 214, and/or any signal processing components of the transmitter 104. In some implementations, the circuitry includes a memory and one or more processors that execute instructions that cause the one or more processors to perform the operations of the baseband processor 202, the modulator 204, the interference cancelator 206, the precoder 208, the pulse shaper 210, the DAC 212, the power amplifier 214, and/or any signal processing components of the transmitter 104. Alternatively, the baseband processor 202, the modulator 204, the interference cancelator 206, the precoder 208, the pulse shaper 210, the DAC 212, the power amplifier 214, and/or any signal processing components of the transmitter 104 may be implemented using dedicated circuitry, such as an application specific integrated circuit (ASIC), a graphics processing unit (GPU), or a programmed field programmable gate array (FPGA) for performing the operations of the baseband processor 202, the modulator 204, the interference cancelator 206, the precoder 208, the pulse shaper 210, the DAC 212, the power amplifier 214, and/or any signal processing components of the transmitter 104. In some implementations, the functionality of the transmitter 104 may be fully or partially implemented in software or modules stored in a memory and executed by the one or more processors.

Figure 4:
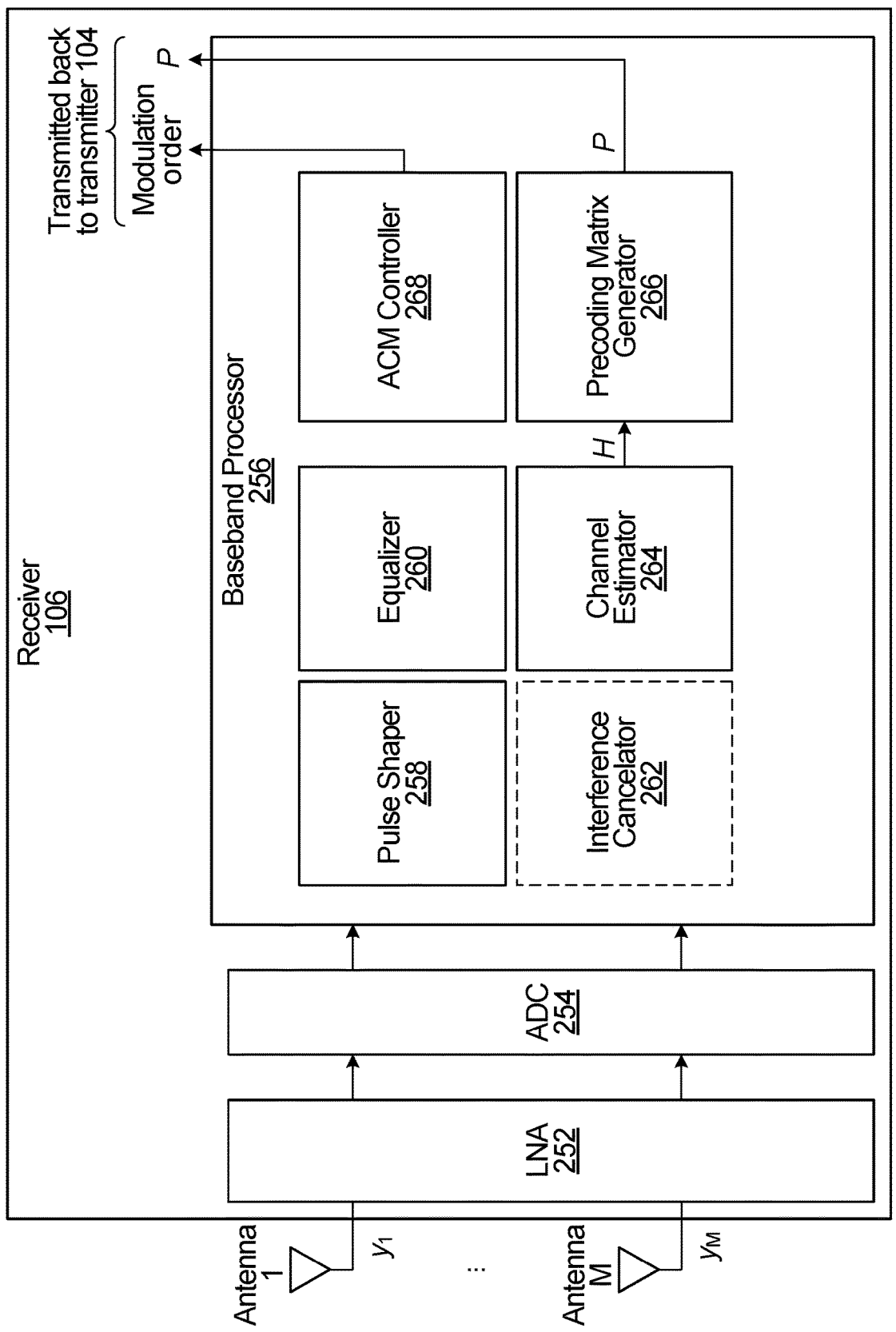
FIG. 4 is a block diagram of a receiver, according to one embodiment.

FIG. 4 is a block diagram of receiver 106, according to one embodiment. The receiver 106 includes a low noise amplifier (LNA) 252 to amplify the received signals on each of the M receive antennas. The receiver 106 further includes an analog-to-digital converter (ADC) 254, which converts the signals from the LNA 252 into M streams of received signal values in the digital domain, each one of the M streams corresponding to a respective different one of the M receive antennas.

The receiver 106 further includes a baseband processor 256 for performing baseband processing on the M streams of received signal values. Baseband processing in baseband processor 256 includes pulse shaping by pulse shaper 258. An example of pulse shaping that may be performed is RRC pulse shaping. Baseband processing in baseband processor 256 further includes equalization by equalizer 260. The type of equalization performed by equalizer 260 is implementation specific and may depend upon the precoding matrix being used, which ultimately depends on the decomposition of channel matrix H discussed later.

Examples of equalization that may be performed depending on the implementation and precoding matrix used include zero-forcing (ZF) equalization and minimum mean square error (MMSE) equalization. As an example, the equalization algorithm implemented may be the least mean squares (LMS) algorithm, which is an adaptive finite impulse response (FIR) filter used to equalize the channel impulse response by finding the filter coefficients that minimizes the least mean square of the error. The equalization algorithm receives as an input one or more matrices obtained from the decomposition of channel matrix H. For example, matrix M of the decomposition $H=MAN^H$ described later, as well as matrix A, may be used by the equalization algorithm to perform equalization of a received signal that was precoded using matrix P=N.

Baseband processing in baseband processor 256 further includes optional interference cancellation by interference cancelator 262. In some embodiments, if interference cancellation is performed at the receiver, then interference cancelator 262 may be implemented as part of detection/decoding, e.g. as part of equalizer 260. An example way to perform interference cancellation is to perform the successive interference cancellation (SIC) algorithm or maximum likelihood (ML) detection. Whether interference cancelator 262 is or is not included is implementation specific, and reasons to include interference cancelator 262, or interference cancelator 206 in the transmitter, are discussed later.

Baseband processing in baseband processor 256 further includes channel estimation by channel estimator 264. In some embodiments, channel estimation operates as follows. On a periodic basis, a reference signal, e.g. in the form of pilots or a training sequence, is transmitted from the transmitter 104 to the receiver 106. The channel estimator 264 performs channel estimation using the reference signal to determine an estimate of the wireless channel in the form of channel matrix H. Algorithms for channel estimation are known. For completeness, a disclosure of example algorithms for channel estimation is: T. Halsig and B. Lankl "Channel Parameter Estimation for LOS MIMO Systems" published in WSA 2016, 20th International ITG Workshop on Smart Antennas, Mar. 9, 2016; and O. Besson and P. Stoica "On Parameter Estimation of MIMO Flat-Fading Channels With Frequency Offsets" published in IEEE Transactions on Signal Processing, vol. 51 No. 3, March 2003.

Baseband processing in baseband processor 256 further includes generation of a precoding matrix P by precoding matrix generator 266. Precoding matrix P is derived from a decomposition of channel matrix H in the manner described later.

Baseband processing in baseband processor 256 further includes adaptive coding and modulation by ACM controller 268. Although not illustrated in FIG. 4, the receiver 106 would typically include other components. For example, a decoder is not illustrated in FIG. 4 even though it would typically be present. Also, in some implementations some or all of the components illustrated in FIG. 4 are distributed. For example, the M antennas, LNA 252, ADC 254, and baseband processor 256 may be on different chips and/or on different boards and/or physically separated and connected via a network. For the purpose of this disclosure the components will still be referred to as being part of receiver 106, even if they are distributed in implementation.

The signal received at the M transmit antennas is represented as Y=HPX+n. Each entry of the vector Y represents a value received at a respective one of the M antennas at a given time unit. In operation, the received signal is amplified by LNA 252, followed by ADC to result in M streams of received signal values in the digital domain. Each one of the M streams corresponds to a respective different one of the M receive antennas. Baseband processing 256 is then performed in baseband processor 256, including the pulse shaping, equalization, and possible interference cancellation. The ACM controller 268 maintains a running average of SNR for each one of the M received streams, and periodically feedback in the form of a message is transmitted back from the ACM controller 268 to the transmitter 104. The feedback adapts the modulation order of one or more of modulators 204_1 to 204_N in the transmitter 104. For example, the feedback may be an instruction to increase or decrease a modulation order, or the feedback may be other information that is used by the modulator 204 to increase or decrease a modulation order. Also on a periodic basis, the channel estimator 264 generates an updated estimate of the channel matrix H, e.g. in response to receipt of a reference signal transmitted from the transmitter 104. Whenever the channel matrix H is updated, the precoding matrix generator 266 computes an updated precoding matrix P, which is then transmitted back to the transmitter 104 for use by the precoder 208. The message from the ACM controller 208 adapting the modulation order may be transmitted back on a more regular basis than the precoding matrix P.

The LNA 252, the ADC 254, the baseband processor 256, the pulse shaper 258, the equalizer 260, the interference cancelator 262, the channel estimator 264, the precoding matrix generator 266, the ACM controller 268, and/or any signal processing components of the receiver 106 may be implemented in the form of circuitry configured to perform the functions of the LNA 252, the ADC 254, the baseband processor 256, the pulse shaper 258, the equalizer 260, the interference cancelator 262, the channel estimator 264, the precoding matrix generator 266, the ACM controller 268, and/or any signal processing components of the receiver 106. In some implementations, the circuitry includes a memory and one or more processors that execute instructions that cause the one or more processors to perform the operations of the LNA 252, the ADC 254, the baseband processor 256, the pulse shaper 258, the equalizer 260, the interference cancelator 262, the channel estimator 264, the precoding matrix generator 266, the ACM controller 268, and/or any signal processing components of the receiver 106. Alternatively, the LNA 252, the ADC 254, the baseband processor 256, the pulse shaper 258, the equalizer 260, the interference cancelator 262, the channel estimator 264, the precoding matrix generator 266, the ACM controller 268, and/or any signal processing components of the receiver 106 may be implemented using dedicated circuitry, such as an ASIC, a GPU, or a programmed FPGA for performing the operations of the LNA 252, the ADC 254, the baseband processor 256, the pulse shaper 258, the equalizer 260, the interference cancelator 262, the channel estimator 264, the precoding matrix generator 266, the ACM controller 268, and/or any signal processing components of the receiver 106. In some implementations, the functionality of the receiver 106 may be fully or partially implemented in software or modules stored in a memory and executed by the one or more processors.

Generation of Precoding Matrix P Using SVD

In some embodiments, a precoding matrix P may be computed by precoding matrix generator 266 by performing a singular value decomposition (SVD) on channel matrix H. The SVD results in matrices U, V, and S, where $H=USV^H$. $V^H$ is the Hermitian of matrix V. The Hermitian of a matrix is sometimes called the conjugate transpose of the matrix. Matrices U and V are unitary, i.e. $UU^H=U^HU=1$ and $VV^H=V^HV=1.1$ is the identity matrix. Matrix S is a diagonal matrix with r=rank(H) diagonal entries. Each diagonal entry is a singular value that is a non-negative real value. S is conventionally represented with the largest magnitude singular value $\lambda_1$ a the top and the smallest magnitude singular value $\lambda_r$ at the bottom, i.e.

$$S = \begin{bmatrix} \lambda_1 & 0 & \cdots & 0 \\ 0 & \lambda_2 & 0 & \vdots \\ \vdots & 0 & \ddots & 0 \\ 0 & \cdots & 0 & \lambda_r \end{bmatrix}.$$

The precoding matrix that is transmitted back to the precoder 208 of the transmitter 104 is P=V.

Computing and using a precoding matrix P equal to the unitary matrix V in a SVD of H will be referred to as SVD precoding. SVD precoding is described in U.S. Pat. No. 9,077,407.

SVD precoding provides decoupled parallel channels and relatively easy equalization at the receiver 106. However, there is a technical problem that can arise when using SVD precoding. Because of analog/radio frequency (RF) impairments in the transmitter 104 and/or receiver 106, e.g. phase noise, time delay, IQ imbalance, etc., there is a limit on the modulation order in modulator 204. For example, the analog impairments may limit the highest modulation order to 4 k-QAM. This restriction is independent of the SNR or the wireless channel. As an example, the analog impairments may limit the highest modulation order to 4 k-QAM, but to achieve 4 k-QAM the SNR of the channel may only need to be 45 dB. If the SNR is higher than 45 dB, e.g. if the SNR were 65 dB, such that the channel could support a modulation order higher than 4 k-QAM, the modulation order would still be limited to 4 k-QAM because of the analog impairments. The extra power present on the channel that results in the SNR exceeding 45 dB is wasted.

In embodiments below, a different precoding technique is presented in which extra power not utilized in one or more streams, e.g. because of analog impairments that place a limitation on maximum modulation order, may instead be used in one or more other streams. Because of the power transfer, a higher modulation order may be achieved, which results in increased data throughput. The precoding technique presented below will be referred to as high threshold decomposition (HTD) precoding.

Generation of the HTD Precoding Matrix

In one embodiment, the HTD precoding matrix is computed by precoding matrix generator 266 based on the following principles.

The spectral efficiency (SE) in bits per second (bps)/hertz (Hz) according to SVD precoding is:

$$SE = \sum_{i=1}^{r=Rank(H)} \log_2(1 + \lambda_i^2 \rho_i)$$

$\rho_i$ is the noise component (e.g. AWGN SNR component) of the $i^{th}$ stream, and $\lambda_i$ is the singular value of the $i^{th}$ stream. By substituting $\gamma_i = \lambda_i^2 \rho_i$, and assuming high SNR levels, the SE may be expressed as:

$$SE = \sum_{i=1}^{r=Rank(H)} \log_2(1 + \gamma_i) \cong \sum_{i=1}^{r=Rank(H)} \log_2(\gamma_i) = \log_2(\gamma_1) + \ldots + \log_2(\gamma_r)$$

m of the $\gamma_i$'s are higher (possibly much higher) than the required power to support the system's highest possible modulation order. Each of those m $\gamma_i$'s can be expressed as:

$$\gamma_i = Thr_i \times \gamma_{ie} \quad i = 1, \ldots, m$$

$Thr_i$ is the threshold level of power required for the designated/desired modulation order in the $i^{th}$ link, e.g. for long range performance. The designated/desired modulation order is typically the highest possible modulation order permitted based on the restrictions imposed by the analog impairments.

The SE equation may be reorganized as follows:

$$SE \cong \sum_{i=1}^{m} \log_2(Thr_i \times \gamma_{ie}) + \sum_{i=m+1}^{r=Rank(H)} \log_2(\gamma_i)$$

The m streams having the higher (underutilized) power will be referred to as the "strong" streams, and the remaining r−m streams will be referred to as the "weak" streams. The residual portion of the power on the strong streams is used to increase the power on l of the weaker streams. Therefore, the SE may be expressed as:

$$SE \cong \sum_{i=1}^{m} \log_2(Thr_i \times \gamma_{ie}) + \sum_{i=m+1}^{r=Rank(H)} \log_2(\gamma_i)$$

$$\cong \sum_{i=1}^{m} [\log_2(Thr_i) + \log_2(\gamma_{ie})] + \sum_{i=m+1}^{m+l} \log_2(\gamma_i) +$$

$$\sum_{i=m+l+1}^{r=Rank(H)} \log_2(\gamma_i)$$

$$\cong \sum_{i=1}^{m} \log_2(Thr_i) + \log_2(\gamma_{1e} \times \ldots \times \gamma_{me}) +$$

$$\log_2(\gamma_{m+1} \times \ldots \times \gamma_{m+l}) + \sum_{i=m+l+1}^{r=Rank(H)} \log_2(\gamma_i)$$

$$\cong \sum_{i=1}^{m} \log_2(Thr_i) + \log_2\{(\gamma_{1e} \times \ldots \times \gamma_{me}) \times$$

$$(\gamma_{m+1} \times \ldots \times \gamma_{m+l})\} + \sum_{i=m+l+1}^{r=Rank(H)} \log_2(\gamma_i)$$

By changing the notation of power for the modified l weaker streams to $\tilde{\gamma}_i$, the SE may be expressed as:

$$SE \cong \sum_{i=1}^{m} \log_2(Thr_i) + \sum_{i=1}^{l} \log_2(\tilde{\gamma}_i) + \sum_{i=m+l+1}^{r=Rank(H)} \log_2(\gamma_i)$$

In general m does not have to equal l, and in general any proportion of residual power from each of one or more strong streams may be transferred to one or more weak streams.

Therefore, in HTD precoding, the extra power of m strong streams can help l weaker streams to be run at higher modulation orders.

However, in HTD precoding there is a trade-off between: (i) the extent to which power is transferred from stronger streams to weaker streams, and (ii) complexity of interference cancellation. More transfer of power may result in higher complexity of interference cancellation required by the transmitter 104 and/or receiver 106. This is explained as follows.

In HTD precoding, the channel matrix H is decomposed into: (i) a matrix A with case-defined values for diagonal elements, and (ii) two unitary and orthogonal matrixes M and N. The decomposition is $H = MAN^H$. $N^H$ is the Hermitian of matrix N. The matrix A has the form $$A = \begin{bmatrix} Thr_1 & \alpha & \alpha & \alpha & \alpha & \alpha & 0 & \ldots & 0 \\ 0 & \ddots & \alpha & \alpha & \alpha & \alpha & 0 & \ldots & 0 \\ 0 & 0 & Thr_m & \alpha & \alpha & \alpha & 0 & \ldots & 0 \\ 0 & \ddots & 0 & \tilde{\gamma}_1 & \alpha & \alpha & 0 & \ldots & 0 \\ 0 & \ldots & 0 & 0 & \ddots & \alpha & 0 & \ldots & 0 \\ 0 & \ldots & 0 & 0 & 0 & \tilde{\gamma}_l & 0 & 0 & 0 \\ 0 & \ldots & 0 & 0 & \ldots & 0 & \gamma_{m+l+1} & 0 & 0 \\ 0 & \ldots & 0 & 0 & \ldots & 0 & 0 & \ddots & 0 \\ 0 & \ldots & 0 & 0 & \ldots & 0 & 0 & 0 & \gamma_r \end{bmatrix}$$

Alpha (α) represents a non-diagonal value that may be a non-zero positive real number. The properties of matrix A are as follows. A is a block diagonal matrix including at least a first block and a second block, each on a main diagonal of A. The first block is a triangular matrix, e.g. the triangular matrix having diagonal elements $Thr_1$ to $\tilde{\gamma}_l$ above. Each diagonal element of the triangular matrix is less than a maximum singular value of the channel matrix H because of power transfer from the strongest stream to a weaker stream. The second block is a diagonal matrix, e.g. the diagonal matrix having diagonal values $\gamma_{m+l+1}$ to $\gamma_r$ above. Each diagonal element of the diagonal matrix is also less than the maximum singular value of the channel matrix H, because these elements represent singular values that are smaller than the maximum singular value of H. The representation of A showing the first block and the second block is as follows:

$$A = \begin{bmatrix} Thr_1 & \alpha & \alpha & \alpha & \alpha & \alpha & 0 & \ldots & 0 \\ 0 & \ddots & \alpha & \alpha & \alpha & \alpha & 0 & \ldots & 0 \\ 0 & 0 & Thr_m & \alpha & \alpha & \alpha & 0 & \ldots & 0 \\ 0 & \ddots & 0 & \tilde{\gamma}_1 & \alpha & \alpha & 0 & \ldots & 0 \\ 0 & \ldots & 0 & 0 & \ddots & \alpha & 0 & \ldots & 0 \\ 0 & \ldots & 0 & 0 & 0 & \tilde{\gamma}_l & 0 & 0 & 0 \\ 0 & \ldots & 0 & 0 & \ldots & 0 & \gamma_{m+l+1} & 0 & 0 \\ 0 & \ldots & 0 & 0 & \ldots & 0 & 0 & \ddots & 0 \\ 0 & \ldots & 0 & 0 & \ldots & 0 & 0 & 0 & \gamma_r \end{bmatrix} = \begin{bmatrix} T & 0 \\ 0 & D \end{bmatrix}$$

T is the first block on the main diagonal. T is a triangular matrix. T=

$$\begin{bmatrix} Thr_1 & \alpha & \alpha & \alpha & \alpha & \alpha \\ 0 & \ddots & \alpha & \alpha & \alpha & \alpha \\ 0 & 0 & Thr_m & \alpha & \alpha & \alpha \\ 0 & \ddots & 0 & \tilde{\gamma}_1 & \alpha & \alpha \\ 0 & \ldots & 0 & 0 & \ddots & \alpha \\ 0 & \ldots & 0 & 0 & 0 & \tilde{\gamma}_l \end{bmatrix}$$

D is the second block on the main diagonal. D is a diagonal matrix. D=

$$\begin{bmatrix} \gamma_{m+l+1} & 0 & 0 \\ 0 & \ddots & 0 \\ 0 & 0 & \gamma_r \end{bmatrix}.$$

The first and second blocks (T and D) are square matrices on the main diagonal of A. The off-diagonal blocks (0) are zero matrices. A zero matrix has all elements that are zero.

The non-zero non-diagonal values in the matrix A represent the interference which must be accounted for at the transmitter 104 using interference cancelator 206 and/or at the receiver 106 using interference cancelator 262. Therefore, it is preferred to minimize the number of possible non-zero non-diagonal elements α in matrix A, but this comes at the trade-off of transferring power to fewer weaker streams. The trade-off is as follows: the more weaker streams that have power transferred to them, the higher the modulation order that may possibly be used to transmit data on those weaker streams, which may increase data throughput; but the more weaker streams that have power transferred to them, the greater the number of possibly non-zero non-diagonal elements in matrix A, which typically means more complex interference cancellation is required. This is because whenever power is transferred from a stronger stream $\lambda_s$ to a weaker stream $\lambda_w$ ($\lambda_s > \lambda_w$), then interference (possible non-zero non-diagonal elements) is introduced in each element (i,j) in the matrix A where i=s ... (w−1) and j=(i+1) ... w. It is therefore desired to transfer power to the l weak streams that are adjacent the m strong streams in A in order to avoid adding unnecessary interference. For example, if some power was instead transferred to $\gamma_r$ in matrix A above, then the whole upper triangular would be possibly non-zero values, which would further increase interference.

FIG. 5 illustrates some examples of power transfer for HTD precoding in which upper triangular matrix A is a 4×4 matrix. In Example 1, there is no power transfer from a stronger stream to a weaker stream, which is the equivalent to SVD precoding. In Example 2, extra power in the stream corresponding to $\lambda_1$ is transferred to the stream corresponding to $\lambda_2$, and this results in a single interference value (possible non-zero non-diagonal value) at matrix entry (1,2). In Example 3, extra power in the stream corresponding to $\lambda_1$ is split between the stream corresponding to $\lambda_2$ and the stream corresponding to $\lambda_3$. This results in interference values (possible non-zero non-diagonal values) at matrix entries (1,2), (1,3), and (2,3). In Example 4, extra power from each of the streams corresponding to $\lambda_1$ and $\lambda_2$ is combined together. The combined power is then divided and transferred to the streams corresponding to $\lambda_3$ and $\lambda_4$ to improve the streams corresponding to $\lambda_3$ and $\lambda_4$. This results in interference values (possible non-zero non-diagonal values) in all upper non-diagonal values in the matrix.

Example 4 of FIG. 5 is disadvantageous because of the amount of interference introduced. The geometric mean decomposition (GMD) described in U.S. Pat. No. 7,711,066, also results in a similar disadvantageous level of interference. GMD precoding results in an equal distribution of power on all streams to obviate the need for bit allocation, but it results in a disadvantageous amount of interference. In GMD precoding, power of all singular values is geometrically averaged over all streams and results in all streams being run with an equal lower QAM order. This causes GMD to suffer from severe interference, and as a result a complex successive interference cancellation is required and sensitivity to time delays is increased. On the other hand, the HTD precoding described herein is flexible to allow for only some power transfer to maintain a more acceptable level of interference cancellation, e.g. like in Example 2 of FIG. 5.

By performing HTD precoding, e.g. like in Example 2 of FIG. 5, the technology is improved compared to SVD precoding because in HTD precoding power is transferred from a stronger stream to a weaker stream when the transferred power is not usable in the stronger stream due to analog impairments or other factors. Because of the power transfer, a higher modulation order may be achieved, which results in increased data throughput. Additionally, by performing HTD precoding, interference may be reduced compared to GMD.

The channel matrix decomposition for HTD precoding is $H=MAN^H$, and the precoding matrix is selected as $P=N$. The precoding matrix $P=N$ for HTD may be derived by applying permutations on the SVD matrices, which means that there is the possibility of HTD for any channel matrix H. For example, in HTD precoding the channel matrix may be expressed as $H=MAN^H=(UE)(E^HSF)(VF)^H=(UE)(E^HSF)(F^HV^H)$, where: $M=UE$, $N=VF$, $A=E^HSF$, and E and F are both unitary matrices, i.e. $EE^H=E^HE=1$, and $FF^H=F^HF=1$. The matrix M is used by the equalizer 260 to perform equalization of a signal that has been precoded by matrix N.

Note that in the embodiments of HTD precoding discussed above, the triangular matrix block of block diagonal matrix A is upper triangular. The triangular matrix block may instead be lower triangular. In the case of an upper triangular matrix, interference cancellation is from the $i^{th}$ stream to $(i-1)^{th}$ stream, whereas in the case of lower triangular matrix, interference cancellation is from $(i-1)^{th}$ stream to the $i^{th}$ stream. Also, the threshold values $Thr_i$ may be constant or varying user-defined. In some embodiments, the threshold values may be computed based on time-invariant factors, such as the distance D between the transmitter and receiver in FIG. 2. In some embodiments, the threshold values may also or instead be computed based on time-varying factors, e.g. the characteristics of the channel. In some embodiments, the threshold values may be set in a way to switch back to SVD or GMD precodings.

HTD Precoding Applied Independently for Each Polarization

As discussed above, HTD precoding may be applied to m strong streams with m different threshold values to improve l weak streams. However, interference cancellation has the potential to become complex, in which case combating system RF impairments such as time delays and phase noise may be challenging. This may place a limit on achievable overall SE in real systems.

To try to optimize HTD performance in order to try to achieve optimum capacity, it is desired to reduce or minimize interference elements. That is, it is desired to reduce or minimize the number of possible non-zero off-diagonal elements a in matrix A. In some implementations, data streams may be transmitted on different polarizations of a wireless signal, e.g. the symbol stream output from modulator 204_1 may be transmitted on the horizontal or "X" polarization of the signal transmitted from antenna 1, and the symbols stream output from modulator 204_2 may be transmitted on the vertical or "Y" polarization of the signal transmitted from antenna 1. In embodiments in which data streams are transmitted on different polarizations, HTD precoding may be performed independently on each polarization, which may help reduce interference by reducing the number of non-zero off-diagonal elements in matrix A. The diagonal elements of matrix A may be rearranged such that all horizontal polarization streams sit together on top rows and all vertical polarization streams sit together afterwards, or vice versa. In one embodiment, the HTD precoding technique is then applied on one strong stream per polarization, which may minimize interference elements and help simplify the modem design and still possibly help to reach optimum capacity.

Applying the HTD precoding technique on only one strong stream per polarization is just an example. More generally, the HTD precoding technique may be applied per polarization to transfer power from any number of strong steams to any number of weak streams. However, a benefit of applying the HTD precoding technique on only one strong stream per polarization is that interference cancellation may not be as complex. For example, if the threshold values are set to only improve one weak stream per polarization, then only one element of interference appears for each polarization, which may make equalization easier. For the case in which power is transferred from one strong stream on the horizontal polarization to one adjacent weaker stream on the horizontal polarization, and power is transferred from one strong stream on the vertical polarization to one adjacent weaker stream on the vertical polarization, then the SE may be expressed as follows:

$$SE \cong \log_2(Thr_{1h}) + \log_2(\tilde{\gamma}_{1h}) + \sum_{i=1}^{\frac{Rank(H)}{2}-2} \log_2(\gamma_{ih}) +$$

$$\log_2(Thr_{1v}) + \log_2(\tilde{\gamma}_{1v}) + \sum_{i=1}^{\frac{Rank(H)}{2}-2} \log_2(\gamma_{iv})$$

$Thr_{1h}$ and $Thr_{1v}$ are the threshold values of the horizontal and vertical polarizations respectively, which may or may not be equal. The matrix A is then as follows:

$$A = \begin{bmatrix} Thr_{1h} & \alpha & 0 & 0 & 0 & 0 & 0 & \cdots & 0 \\ 0 & \tilde{\gamma}_{1h} & 0 & 0 & 0 & 0 & 0 & \cdots & 0 \\ 0 & 0 & \ddots & 0 & 0 & 0 & 0 & \cdots & 0 \\ 0 & \ddots & 0 & \ddots & 0 & 0 & 0 & \cdots & 0 \\ 0 & \cdots & 0 & 0 & Thr_{1v} & \alpha & 0 & \cdots & 0 \\ 0 & \cdots & 0 & 0 & 0 & \tilde{\gamma}_{1v} & 0 & 0 & 0 \\ 0 & \cdots & 0 & 0 & 0 & 0 & \ddots & 0 & 0 \\ 0 & \cdots & 0 & 0 & 0 & 0 & 0 & \ddots & 0 \\ 0 & \cdots & 0 & 0 & 0 & 0 & 0 & 0 & \gamma_r \end{bmatrix}$$

The properties of this matrix A are as follows. A is a block diagonal matrix including at least a first block, a second block, and a third block on the main diagonal elements of A. The first block of matrix A is a first triangular matrix, e.g. the triangular matrix having diagonal elements $Thr_{1h}$ and $\tilde{\gamma}_{1h}$ above. Each diagonal element of the first triangular matrix is less than a maximum singular value of the channel matrix H because of power transfer from the strongest stream to a weaker stream. The second block of matrix A is a diagonal matrix, e.g. the diagonal matrix having the diagonal values after $\tilde{\gamma}_{1h}$ and before $Thr_{1v}$, or the diagonal matrix having the diagonal values after $\tilde{\gamma}_{1v}$ up to and including $\gamma_r$. Each diagonal element of the diagonal matrix is also less than the maximum singular value of the channel matrix H. The third block of matrix A is a second triangular matrix, e.g. the triangular matrix having diagonal elements $Thr_{1v}$ and $\tilde{\gamma}_{1v}$ above. Each diagonal element of the second triangular matrix is less than a maximum singular value of the channel matrix H. The first block corresponds to a first set of data streams all transmitted on a horizontal polarization, and the third block corresponds to a second set of data streams all transmitted on a vertical polarization. In the specific block diagonal matrix A presented above there are actually two diagonal blocks: the diagonal matrix having the diagonal values after $\tilde{\gamma}_{1h}$ and before $Thr_{1v}$, and the diagonal matrix having the diagonal values after up to and including $\gamma_r$. The representation of the specific block diagonal matrix A above showing the blocks, is as follows:

$$A = \begin{bmatrix} Thr_{1h} & \alpha & 0 & 0 & 0 & 0 & 0 & \ldots & 0 \\ 0 & \tilde{\gamma}_{1h} & 0 & 0 & 0 & 0 & 0 & \ldots & 0 \\ 0 & 0 & \ddots & 0 & 0 & 0 & 0 & \ldots & 0 \\ 0 & \ddots & 0 & \ddots & 0 & 0 & 0 & \ldots & 0 \\ 0 & \ldots & 0 & 0 & Thr_{1v} & \alpha & 0 & \ldots & 0 \\ 0 & \ldots & 0 & 0 & 0 & \tilde{\gamma}_{1v} & 0 & 0 & 0 \\ 0 & \ldots & 0 & 0 & 0 & 0 & \ddots & 0 & 0 \\ 0 & \ldots & 0 & 0 & 0 & 0 & 0 & \ddots & 0 \\ 0 & \ldots & 0 & 0 & 0 & 0 & 0 & 0 & \gamma_r \end{bmatrix} = \begin{bmatrix} T_H & 0 & 0 & 0 \\ 0 & D_H & 0 & 0 \\ 0 & 0 & T_V & 0 \\ 0 & 0 & 0 & D_V \end{bmatrix}$$

$T_H$ is the first block on the main diagonal. $T_H$ is a triangular matrix corresponding to the horizontal polarization.

$$T_H = \begin{bmatrix} Thr_{1h} & \alpha \\ 0 & \tilde{\gamma}_{1h} \end{bmatrix}.$$

$D_H$ is the second block on the main diagonal. $D_H$ is a diagonal matrix with diagonal values equal to the diagonal elements in A present after $\tilde{\gamma}_{1h}$ and before $Thr_{1v}$.

$T_V$ is the third block on the main diagonal. $T_V$ is a triangular matrix corresponding to the vertical polarization.

$$T_V = \begin{bmatrix} Thr_{1v} & \alpha \\ 0 & \tilde{\gamma}_{1v} \end{bmatrix}.$$

$D_V$ is the fourth block on the main diagonal. $D_V$ is a diagonal matrix with diagonal values equal to the diagonal elements in A present after $\tilde{\gamma}_{1v}$ and up to and including $\gamma_r$.

The off-diagonal blocks (0) are zero matrices.

More generally there does not have to be two diagonal blocks, e.g. if the rows of matrix A were moved around to have only one diagonal block.

In the specific block diagonal matrix A presented above there are only two interference elements, i.e. only two non-diagonal possibly non-zero elements α.

FIG. 6 illustrates applying HTD precoding independently on each polarization compared to not applying HTD precoding independently on each polarization. In the example in FIG. 6, there are four transmitted streams: one stream transmitted on the horizontal polarization h of a first antenna 1 ($\lambda_{1h}$), another stream transmitted on the vertical polarization v of the first antenna 1 ($\lambda_{1v}$), another stream transmitted on the horizontal polarization h of a second antenna 2 ($\lambda_{2h}$), and another stream transmitted on the vertical polarization v of the second antenna 2 ($\lambda_{2v}$). When HTD precoding is not applied independently on each polarization, then there is more interference, as shown at 312. When HTD precoding is instead applied independently on each polarization, then there is less interference, as shown at 314.

In some embodiments, HTD precoding may be applied to both polarizations, e.g. in the manner discussed above, or to only one of the polarizations.

Example Methods

Figure 7:
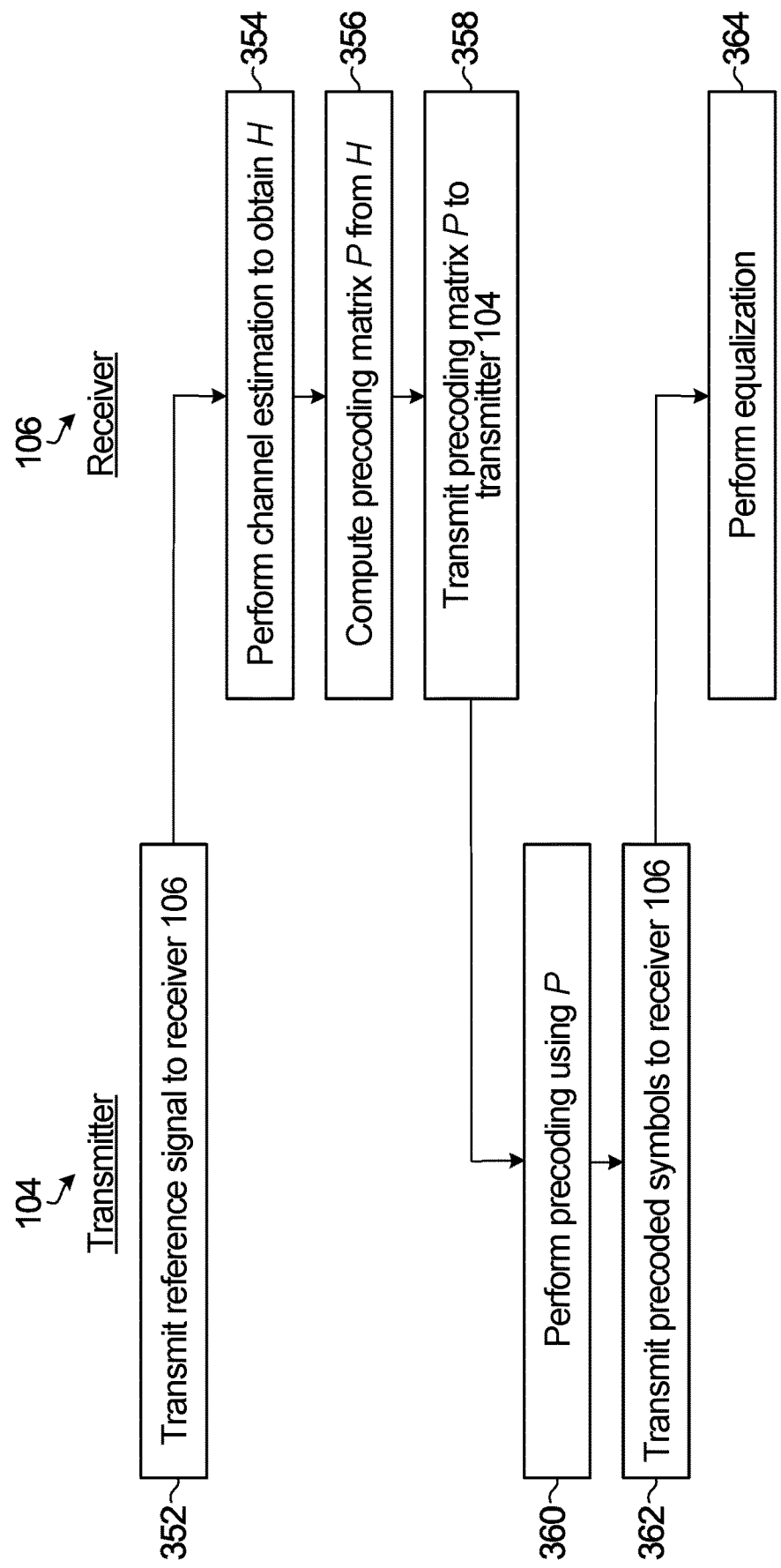
FIG. 7 is a flow chart of steps performed by a transmitter and receiver, according to one embodiment.

FIG. 7 is a flow chart of steps performed by the transmitter 104 and receiver 106 according to one embodiment.

In step 352, a reference signal, e.g. in the form of a pilot or training sequence, is transmitted from the transmitter 104 to the receiver 106.

In step 354, the channel estimator 264 of the receiver 106 performs channel estimation using the reference signal to determine an estimate of the wireless channel in the form of channel matrix H.

In step 356, the precoding matrix generator 266 of the receiver 106 computes the precoding matrix P from the channel matrix H by computing the decomposition $H=MAN^H$ and selecting P as N, ie. P=N.

In step 358, the precoding matrix P=N is transmitted back to the transmitter 104.

In step 360, the precoding matrix P=N that was transmitted back to the transmitter 104 in step 360 is used by the precoder 208 to perform precoding. Precoding is performed in baseband domain by multiplying the orthogonal unitary matrix P with the vector of symbols to be transmitted X, i.e. X→PX.

In step 362, the precoded vector of symbols PX is transmitted from the transmitter 104 to the receiver 106. The received signal is represented as $$Y=H(PX)+n=(MAN^H)(NX)+n=(MA)X+n$$

In step 364, the equalizer 260 of the receiver performs equalization on the received signal using matrix M. Because matrix A is not diagonal, linear equalization at the receiver will suffer from noise enhancement. Interference cancellation may therefore be performed at the transmitter side via interference cancelator 206, or at the receiver side via interference cancelator 262, or at both sides. As an example, interference cancellation at the transmitter side may be performed using Tomlinson-Harashima Precoding (THP) before MIMO precoding. Interference cancellation at the receiver side may be performed using the successive cancellation algorithm or Maximum Likelihood (ML) detection. The complexity of the interference cancellation depends upon how many non-zero non-diagonal elements are present in matrix A, which is dependent upon the extent of the power transfer from stronger streams to weaker streams in step 356. For example, the power transfer illustrated in Example 4 of FIG. 5 results in relatively complex interference cancellation because the whole upper triangular matrix has possible non-zero non-diagonal elements α, whereas the power transfer illustrated in Example 2 of FIG. 5 results in less complex interference cancellation because there is only one possible non-zero non-diagonal element a.

Figure 8:
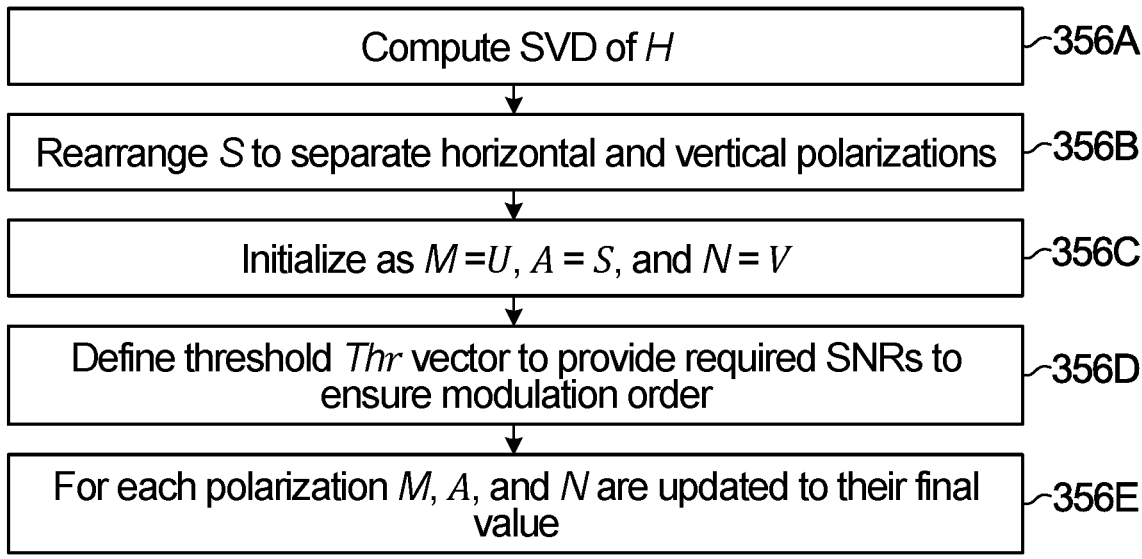
FIG. 8 is a flow chart of substeps that may be performed by a precoding matrix generator of the receiver, according to one embodiment.

Step 356 of FIG. 7 may be performed in different ways depending upon the implementation. For completeness, FIG. 8 is a flow chart of operations that may be performed by the precoding matrix generator 266 of the receiver 106 to execute step 356, according to one embodiment.

In step 356A, the SVD of H is computed ($H=USV^H$) to obtain diagonal matrix S and unitary matrices U and V.

In step 356B, the diagonal matrix S is rearranged to separate the horizontal and vertical polarizations. The corresponding columns of U and V matrixes are rearranged accordingly.

In step 356C, matrices M, A, and N of the decomposition $H=MAN^H$ are initialized as M=U, A=S, and N=V, where U, S, and V are rearranged, as per step 356B.

In step 356D, a threshold value vector Thr is defined to provide the required SNRs to ensure the designated/desired modulation order, e.g. QAM order, for each stream.

In step 356E, for each polarization M, A, and N are updated to obtain the final value of M, A, and N. One way to perform step 356E is as follows. For each polarization:

1. Count the number of strong streams with extra powers m and accumulate all extra powers. In one embodiment, the number of strong streams is counted as the number of adjacent streams m in the matrix A, for the polarization, that have power above the threshold value. Then, the extra power above the threshold for each one of those m strong streams is accumulated. Step 1 may be performed as follows:
initialization: m=0; ExtraPower=1;
For k=1: Rank (H)/2
  if A(k,k)>Thr(k):

$$m = m + 1; \tilde{\gamma}(k) = Thr(k); ExtraPower = ExtraPower * \frac{A(k, k)}{Thr(k)};$$

2. Transfer the accumulated extra power ("ExtraPower") to the adjacent 1 weak streams in matrix A. In one embodiment, the first weak stream immediately adjacent to the last of the m strong streams has enough power transferred to it to bring the power level up to the threshold value for that weak stream, and then the same operation is performed for the next adjacent weak stream, and so on, until there is no extra power left. This may be performed as follows:
initialization: l=0;
For k=m+1: Rank (H)/2
  l=l+1; $\tilde{\gamma}(k)$=A(k, k)*ExtraPower;

$$\text{if } \tilde{\gamma}(k) > Thr(k), ExtraPower = \frac{\tilde{\gamma}_k}{Thr(k)}; \tilde{\gamma}(k) = Thr(k),$$

else break.
3. For i=1: Rank(H)/2−1
  if A(i,i)≥$\tilde{\gamma}$(i), choose j>i such that A(j,j)≤$\tilde{\gamma}$(i), and if A(i,i)<$\tilde{\gamma}$(i), choose j>i such that A(j,j)≥$\tilde{\gamma}$(i)
Re-arrange M, A and N matrixes as follows:

$$A(i+1,i+1) \rightarrow A(j,j)$$

$$N(:,i+1) \rightarrow N(:,j)$$

$$M(:,i) \rightarrow M(:,j)$$

Calculate parameters c and s as follows:

$$c = \sqrt{\frac{\tilde{\gamma}(i)^2 - A(j,j)^2}{A(i,i)^2 - A(j,j)^2}}$$

$$s = \sqrt{1 - c^2}$$

define E and F matrixes as:

$$E = \begin{bmatrix} c & -s \\ s & c \end{bmatrix}$$

$$E = \begin{bmatrix} cA(i,i) & -sA(j,j) \\ sA(j,j) & cA(i,i) \end{bmatrix}$$

Update M, A and N matrixes by E and F as follows:

$$M \rightarrow ME$$

$$A \rightarrow E^H AF$$

$$N \rightarrow NF.$$

Figure 9:
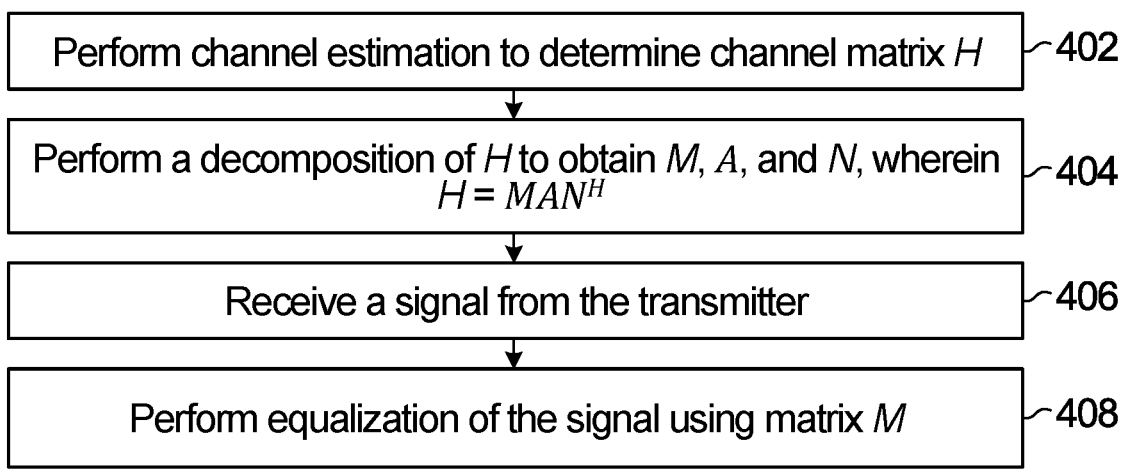
FIG. 9 is a flow chart of a method performed by a receiver, according to one embodiment.

FIG. 9 is a flow chart of a method performed by receiver 106, according to one embodiment.

In step 402, the receiver 106 performs channel estimation to determine a channel matrix H that represents a wireless channel between the transmitter 104 and the receiver 106.

In step 404, the receiver 106 performs a decomposition of the channel matrix H to obtain matrices M, A, and N, wherein H=MAN$^H$. N$^H$ is the Hermitian of N. M and N are each a unitary and orthogonal matrix. A has the following properties: (1) A is a block diagonal matrix including a first block and a second block that is separate from the first block; (2) the first block is a triangular matrix, wherein each diagonal element of the triangular matrix is less than a maximum singular value of the channel matrix H; and (3) the second block is a diagonal matrix, wherein each diagonal element of the diagonal matrix is less than the maximum singular value of the channel matrix H.

In step 406, the receiver 106 receives a signal from the transmitter 104.

In step 408, the receiver 106 performs equalization of the signal using matrix M.

In some embodiments, the method further includes the receiver 106 transmitting N to the transmitter to be used for precoding the signal, and the signal equalized in step 408 is a signal that was precoded using N.

In some embodiments, at least two diagonal elements of the triangular matrix of block diagonal matrix A have a value equal to each other and larger than the value of all other diagonal elements of the triangular matrix. For example, Thr$_1$=Thr$_2$. The at least two diagonal elements may be adjacent to one another, e.g. Thr$_1$ is a diagonal element adjacent to Thr$_2$.

In some embodiments, block diagonal matrix A further includes a third block that is a triangular matrix. The first block corresponds to a first set of data streams all transmitted on a horizontal polarization, and the third block corresponds to a second set of data streams all transmitted on a vertical polarization.

In some embodiments, performing the decomposition of the channel matrix H includes: (1) performing a SVD of the channel matrix H to obtain a diagonal matrix S having a plurality of singular values; and (2) transferring some magnitude from a largest singular value $\lambda_i$ in the matrix S to at least one other singular value $\lambda_j$ in the matrix S to reduce the magnitude of $\lambda_i$ and increase the magnitude of $\lambda_j$. In some embodiments, the magnitude transferred from singular value $\lambda_i$ is equal to a residual amount above a threshold value Thr$_i$.

Figure 10:
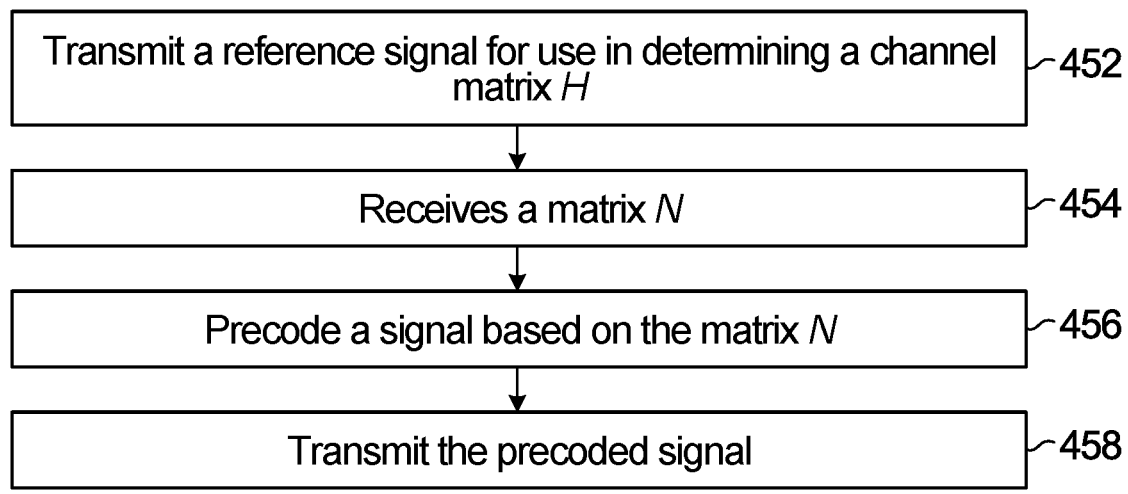
FIG. 10 is a flow chart of a method performed by a transmitter, according to one embodiment.

FIG. 10 is a flow chart of a method performed by transmitter 104, according to one embodiment.

In step 452, the transmitter 104 transmits a reference signal to the receiver 106 for use by the receiver 106 to determine a channel matrix H representing a wireless channel between the transmitter 104 and the receiver 106.

In step 454, the transmitter 104 subsequently receives a matrix N from the receiver 106. The matrix N was obtained by the receiver 106 from a decomposition of the channel matrix H.

In step 456, the transmitter 104 precodes a signal based on the matrix N to obtain a precoded signal.

In step 458, the transmitter 104 transmits the precoded signal to the receiver 106 over the wireless channel.

The matrix N is related to the channel matrix H as follows: $H=MAN^H$. $N^H$ is the Hermitian of N. M and N are each a unitary and orthogonal matrix. A is a matrix that has the following properties: (1) A is a block diagonal matrix including a first block and a second block that is separate from the first block; (2) the first block is a triangular matrix, wherein each diagonal element of the triangular matrix is less than a maximum singular value of the channel matrix H; and (3) the second block is a diagonal matrix, wherein each diagonal element of the diagonal matrix is less than the maximum singular value of the channel matrix H.

In some embodiments, at least two diagonal elements of the triangular matrix have a value equal to each other and larger than the value of all other diagonal elements of the triangular matrix.

In some embodiments, matrix A further includes a third block that is also a triangular matrix. The first block corresponds to a first set of data streams all transmitted by the transmitter on a horizontal polarization, and the third block corresponds to a second set of data streams all transmitted by the transmitter on a vertical polarization.

Figure 11:
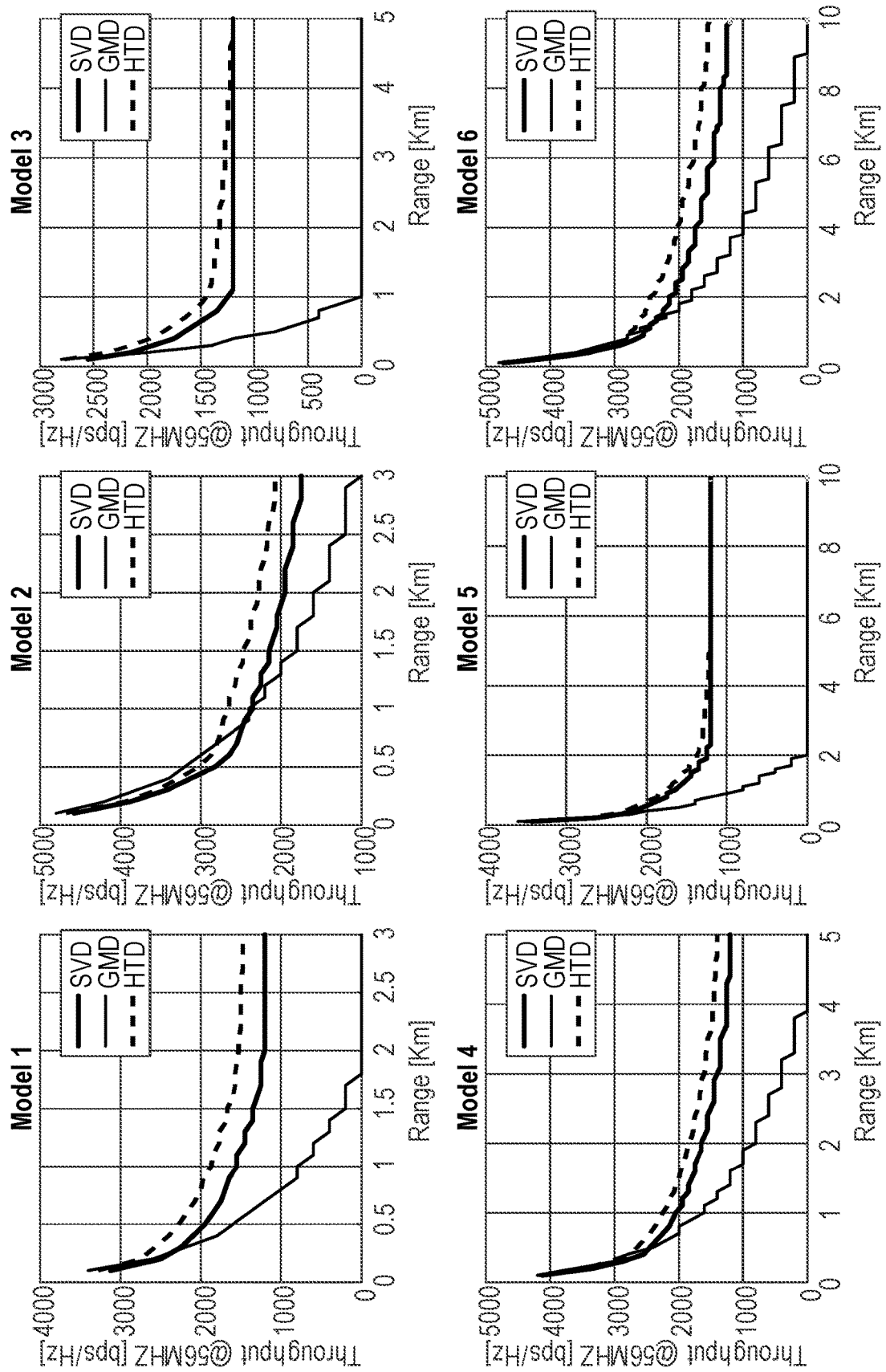
FIG. 11 illustrates simulations comparing different types of precoding.

FIG. 11 illustrates simulations comparing SVD, GMD, and HTD under different frequency, antenna size, and antenna spacing. As shown in the simulations, HTD may result in higher data throughput.

Conclusion

One particular type of precoding for MIMO systems is disclosed herein, that is referred to as HTD precoding. HTD precoding is based on the premise of distributing singular values corresponding to power, e.g. based on system limitation and requirements. There may be m arbitrary thresholds and l arbitrarily modified streams. Horizontal and vertical elements may be separated, e.g. as described above in relation to FIG. 6. In some embodiments for operational simplicity m=l=1.

HTD precoding may be used in LOS MIMO in order to possibly reach optimum capacity despite practical system limitations. HTD may be optimized according to system limitations and requirements in backhaul microwave systems. Although HTD precoding is discussed in the context of LOS MIMO, it may be applied to any kind of MIMO application, e.g. mobile or fixed network, multi-user MIMO, massive MIMO, etc.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
performing channel estimation to determine a channel matrix H that represents a wireless channel between a transmitter and a receiver;
performing a decomposition of the channel matrix H to obtain matrices M, A, and N, wherein $H=MAN^H$, wherein $N^H$ is the Hermitian of N, wherein M and N are each a unitary and orthogonal matrix, and wherein A has the following properties:
A is a block diagonal matrix including a first block and a second block that is separate from the first block;
the first block is a triangular matrix, wherein each diagonal element of the triangular matrix is less than a maximum singular value of the channel matrix H; and
the second block is a diagonal matrix, wherein each diagonal element of the diagonal matrix is less than the maximum singular value of the channel matrix H;
receiving a signal from the transmitter; and
performing equalization of the signal using matrix M.

2. The method of claim 1, further comprising transmitting N to the transmitter to be used for precoding the signal.

3. The method of claim 1, wherein at least two diagonal elements of the triangular matrix have a value equal to each other and larger than the value of all other diagonal elements of the triangular matrix.

4. The method of claim 3, wherein the at least two diagonal elements are adjacent to one another.

5. The method of claim 1, wherein A further includes a third block that is a triangular matrix, and wherein the first block corresponds to a first set of data streams all transmitted on a horizontal polarization, and wherein the third block corresponds to a second set of data streams all transmitted on a vertical polarization.

6. The method of claim 1, wherein performing the decomposition of the channel matrix H includes: performing a singular value decomposition (SVD) of the channel matrix H to obtain a diagonal matrix S having a plurality of singular values; and transferring some magnitude from a largest singular value in the matrix S to at least one other singular value in the matrix S to reduce the magnitude of the largest singular value and increase the magnitude of the at least one other singular value.

7. A receiver comprising:
a channel estimator to determine a channel matrix H that represents a wireless channel between a transmitter and the receiver;
a precoding matrix generator to perform a decomposition of the channel matrix H to obtain matrices M, A, and N, wherein H=MAN$^H$, wherein N$^H$ is the Hermitian of N, wherein M and N are each a unitary and orthogonal matrix, and wherein A has the following properties:
A is a block diagonal matrix including a first block and a second block that is separate from the first block;
the first block is a triangular matrix, wherein each diagonal element of the triangular matrix is less than a maximum singular value of the channel matrix H; and
the second block is a diagonal matrix, wherein each diagonal element of the diagonal matrix is less than the maximum singular value of the channel matrix H;
at least one antenna to receive a signal from the transmitter; and
an equalizer to perform equalization of the signal using matrix M.

8. The receiver of claim 7, wherein matrix N is for transmission to the transmitter to be used for precoding the signal.

9. The receiver of claim 7, wherein at least two diagonal elements of the triangular matrix have a value equal to each other and larger than the value of all other diagonal elements of the triangular matrix.

10. The receiver of claim 9, wherein the at least two diagonal elements are adjacent to one another.

11. The receiver of claim 7, wherein A further includes a third block that is a triangular matrix, and wherein the first block corresponds to a first set of data streams all transmitted on a horizontal polarization, and wherein the third block corresponds to a second set of data streams all transmitted on a vertical polarization.

12. The receiver of claim 7, wherein the precoding matrix generator is to perform the decomposition of the channel matrix H by: performing a singular value decomposition (SVD) of the channel matrix H to obtain a diagonal matrix S having a plurality of singular values; and transferring some magnitude from a largest singular value in the matrix S to at least one other singular value in the matrix S to reduce the magnitude of the largest singular value and increase the magnitude of the at least one other singular value.

13. A method comprising:
transmitting a reference signal to a receiver for use by the receiver to determine a channel matrix H representing a wireless channel between a transmitter and the receiver;
receiving a matrix N from the receiver;
precoding a signal based on the matrix N to obtain a precoded signal; and
transmitting the precoded signal to the receiver over the wireless channel;
wherein the matrix N is related to channel matrix H as follows: H=MAN$^H$, wherein N$^H$ is the Hermitian of N, wherein M and N are each a unitary and orthogonal matrix, and wherein A is a matrix that has the following properties:
A is a block diagonal matrix including a first block and a second block that is separate from the first block;
the first block is a triangular matrix, wherein each diagonal element of the triangular matrix is less than a maximum singular value of the channel matrix H; and
the second block is a diagonal matrix, wherein each diagonal element of the diagonal matrix is less than the maximum singular value of the channel matrix H.

14. The method of claim 13, wherein at least two diagonal elements of the triangular matrix have a value equal to each other and larger than the value of all other diagonal elements of the triangular matrix.

15. The method of claim 13, wherein A further includes a third block that is a triangular matrix, and wherein the first block corresponds to a first set of data streams all transmitted by the transmitter on a horizontal polarization, and wherein the third block corresponds to a second set of data streams all transmitted by the transmitter on a vertical polarization.

16. A transmitter comprising:
at least one antenna to transmit a reference signal to a receiver for use by the receiver to determine a channel matrix H representing a wireless channel between the transmitter and the receiver;
a precoder to precode a signal based on a matrix N to obtain a precoded signal;
the at least one antenna to transmit the precoded signal to the receiver over the wireless channel;
wherein matrix N is related to channel matrix H as follows: H=MAN$^H$, wherein N$^H$ is the Hermitian of N, wherein M and N are each a unitary and orthogonal matrix, and wherein A is a matrix that has the following properties:
A is a block diagonal matrix including a first block and a second block that is separate from the first block;
the first block is a triangular matrix, wherein each diagonal element of the triangular matrix is less than a maximum singular value of the channel matrix H; and
the second block is a diagonal matrix, wherein each diagonal element of the diagonal matrix is less than the maximum singular value of the channel matrix H.

17. The transmitter of claim 16, wherein at least two diagonal elements of the triangular matrix have a value equal to each other and larger than the value of all other diagonal elements of the triangular matrix.

18. The transmitter of claim 16, wherein A further includes a third block that is a triangular matrix, and wherein the first block corresponds to a first set of data streams to be transmitted by the transmitter on a horizontal polarization, and wherein the third block corresponds to a second set of data streams to be transmitted by the transmitter on a vertical polarization.

19. A method comprising:
a receiver performing channel estimation to determine a channel matrix H that represents a wireless channel between a transmitter and the receiver;
the receiver performing a decomposition of the channel matrix H to obtain matrices M, A, and N, wherein H=MAN$^H$, wherein N$^H$ is the Hermitian of N, wherein M and N are each a unitary and orthogonal matrix, and wherein A has the following properties:

A is a block diagonal matrix including a first block and a second block that is separate from the first block;

the first block is a triangular matrix, wherein each diagonal element of the triangular matrix is less than a maximum singular value of the channel matrix H; and the second block is a diagonal matrix, wherein each diagonal element of the diagonal matrix is less than the maximum singular value of the channel matrix H;

the receiver sending N to the transmitter to be used for precoding a signal;

the transmitter receiving N and precoding the signal using N to obtain a precoded signal;

the transmitter transmitting the precoded signal to the receiver;

the receiver receiving the precoded signal as a received signal; and the receiver performing equalization of the received signal using matrix M.

20. The method of claim 19, wherein at least two diagonal elements of the triangular matrix have a value equal to each other and larger than the value of all other diagonal elements of the triangular matrix.

21. The method of claim 19, wherein A further includes a third block that is a triangular matrix, and wherein the first block corresponds to a first set of data streams to be transmitted by the transmitter on a horizontal polarization, and wherein the third block corresponds to a second set of data streams to be transmitted by the transmitter on a vertical polarization.

22. A system comprising:

a receiver; and a transmitter;

the receiver to perform channel estimation to determine a channel matrix H that represents a wireless channel between the transmitter and the receiver;

the receiver to perform a decomposition of the channel matrix H to obtain matrices M, A, and N, wherein $H=MAN^H$, wherein $N^H$ is the Hermitian of N, wherein M and N are each a unitary and orthogonal matrix, and wherein A has the following properties:

A is a block diagonal matrix including a first block and a second block that is separate from the first block;

the first block is a triangular matrix, wherein each diagonal element of the triangular matrix is less than a maximum singular value of the channel matrix H; and the second block is a diagonal matrix, wherein each diagonal element of the diagonal matrix is less than the maximum singular value of the channel matrix H;

the receiver to send N to the transmitter to be used for precoding a signal;

the transmitter to receive N and precode the signal using N to obtain a precoded signal;

the transmitter to transmit the precoded signal to the receiver;

the receiver to receive the precoded signal as a received signal; and the receiver to perform equalization of the received signal using matrix M.

23. The system of claim 22, wherein at least two diagonal elements of the triangular matrix have a value equal to each other and larger than the value of all other diagonal elements of the triangular matrix.

24. The system of claim 22, wherein A further includes a third block that is a triangular matrix, and wherein the first block corresponds to a first set of data streams to be transmitted by the transmitter on a horizontal polarization, and wherein the third block corresponds to a second set of data streams to be transmitted by the transmitter on a vertical polarization.

* * * * *